(12) United States Patent
Lafreniere et al.

(10) Patent No.: US 9,407,748 B2
(45) Date of Patent: Aug. 2, 2016

(54) SYSTEM AND METHOD FOR PROVIDING BROADBAND NOTIFICATION

(75) Inventors: Gary W. Lafreniere, Olathe, KS (US); David Emerson, Overland Park, KS (US); Michael Goergen, Bend, OR (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1353 days.

(21) Appl. No.: 12/362,067

(22) Filed: Jan. 29, 2009

(65) Prior Publication Data

US 2010/0189231 A1    Jul. 29, 2010

(51) Int. Cl.
*H04M 11/00* (2006.01)
*H04M 1/253* (2006.01)
*H04M 1/57* (2006.01)
*H04M 1/65* (2006.01)
*H04M 1/663* (2006.01)

(52) U.S. Cl.
CPC ............ *H04M 1/2535* (2013.01); *H04M 1/575* (2013.01); *H04M 1/6505* (2013.01); *H04M 1/663* (2013.01)

(58) Field of Classification Search
CPC . H04M 1/2535; H04M 1/663; H04M 1/6505; H04M 1/575; H04M 3/42042; H04M 2201/38; H04M 1/27455; H04M 1/57; H04M 3/493; H04M 3/382; H04M 1/70; H04M 15/36; H04Q 5/00; H04Q 5/02; H04Q 3/00
USPC .................. 379/93.23, 93.24, 93.01, 207.15, 379/207.14, 127.06, 127.01, 88.21; 455/414.1, 567, 566, 415
See application file for complete search history.

(56) References Cited

U.S. PATENT DOCUMENTS

| 6,067,355 | A | * | 5/2000 | Lim et al. ................. 379/142.14 |
| 7,096,009 | B2 | * | 8/2006 | Mousseau et al. ............ 455/415 |
| 7,418,090 | B2 | * | 8/2008 | Reding et al. ............ 379/202.01 |
| 7,804,821 | B2 | * | 9/2010 | Wilhoite et al. .............. 370/356 |
| 2002/0126654 | A1 | * | 9/2002 | Preston et al. ................ 370/352 |
| 2002/0191587 | A1 | * | 12/2002 | Wong et al. .................... 370/352 |
| 2008/0130633 | A1 | * | 6/2008 | Ying et al. .................... 370/352 |
| 2008/0137643 | A1 | * | 6/2008 | Khanchandani et al. ..... 370/352 |
| 2009/0238358 | A1 | * | 9/2009 | Ramanathan et al. ... 379/221.03 |
| 2010/0217837 | A1 | * | 8/2010 | Ansari et al. .................. 709/218 |

* cited by examiner

*Primary Examiner* — Simon Sing
(74) *Attorney, Agent, or Firm* — Swanson & Bratschun, L.L.C.

(57) ABSTRACT

Embodiments of the disclosed invention include a system and a method for providing, among other things, local calling name caller identification to a broadband phone, personalized user-specified actions associated with a plurality of users based on an incoming caller identification number to a broadband phone, and remote access to locally stored data on a broadband phone.

20 Claims, 6 Drawing Sheets

SYSTEM AND METHOD FOR PROVIDING BROADBAND NOTIFICATION

BACKGROUND

Caller identification (Caller identification) is a telephone service that transmits a caller's number to the called party's telephone equipment during the ringing signal, or when the call is being set up but before the call is answered. Where available, caller identification may also provide a name associated with the calling telephone number. A telephone exchange center, such as a central office or mobile switching station, generally retrieves the name associated with the calling telephone number from a third party calling name database (CNAM). The owner of the calling name database charges a fee per query for access to the information. In turn, the telephone service provider generally charges a higher fee to consumers that desire this service.

SUMMARY OF THE INVENTION

Embodiments of the disclosed invention include a system and method for providing, among other things, caller identification notification via a broadband phone. In one embodiment, the method includes receiving, at a broadband phone, a caller identification number associated with an incoming call. The method queries an address book to determine a calling name associated with the caller identification number. In response to identifying the calling name associated with the caller identification number, the method presents the calling name and the calling identification number on a display screen associated with the broadband phone.

In accordance with another embodiment of the invention, a method is disclosed for providing remote network access to data stored on a broadband phone. In one embodiment, the method includes receiving, at a broadband phone, a user request to access data stored on the broadband phone. In some embodiments, the user accesses a web site via a web browser to initiate the user request. In one embodiment, the method may request authorization credentials from the user associated with the network request. In response to receiving the authorization credentials, the method verifies the authorization credentials. After verifying the received authorization credentials, the method transmits an access indicator to the web site, wherein the web site displays a user interface that includes features for enabling the user to retrieve and modify the data stored on the broadband phone.

In another embodiment, a broadband phone is disclosed for providing, among other things, local calling name caller identification to a broadband phone, personalized user-specified actions based on an incoming caller identification number to a broadband phone, and remote access to locally stored data on a broadband phone. In one embodiment, the broadband phone includes a broadband interface for communicating data between the broadband phone and one or more communication devices; an audio codec for coding and decoding voice data; a processor for processing computer executable instructions associated with functions of the broadband phone; and a caller identification generator module for identifying a calling name associated with a caller identification number from one or more address books and for presenting the calling name and the caller identification number on a display screen associated with the broadband phone.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
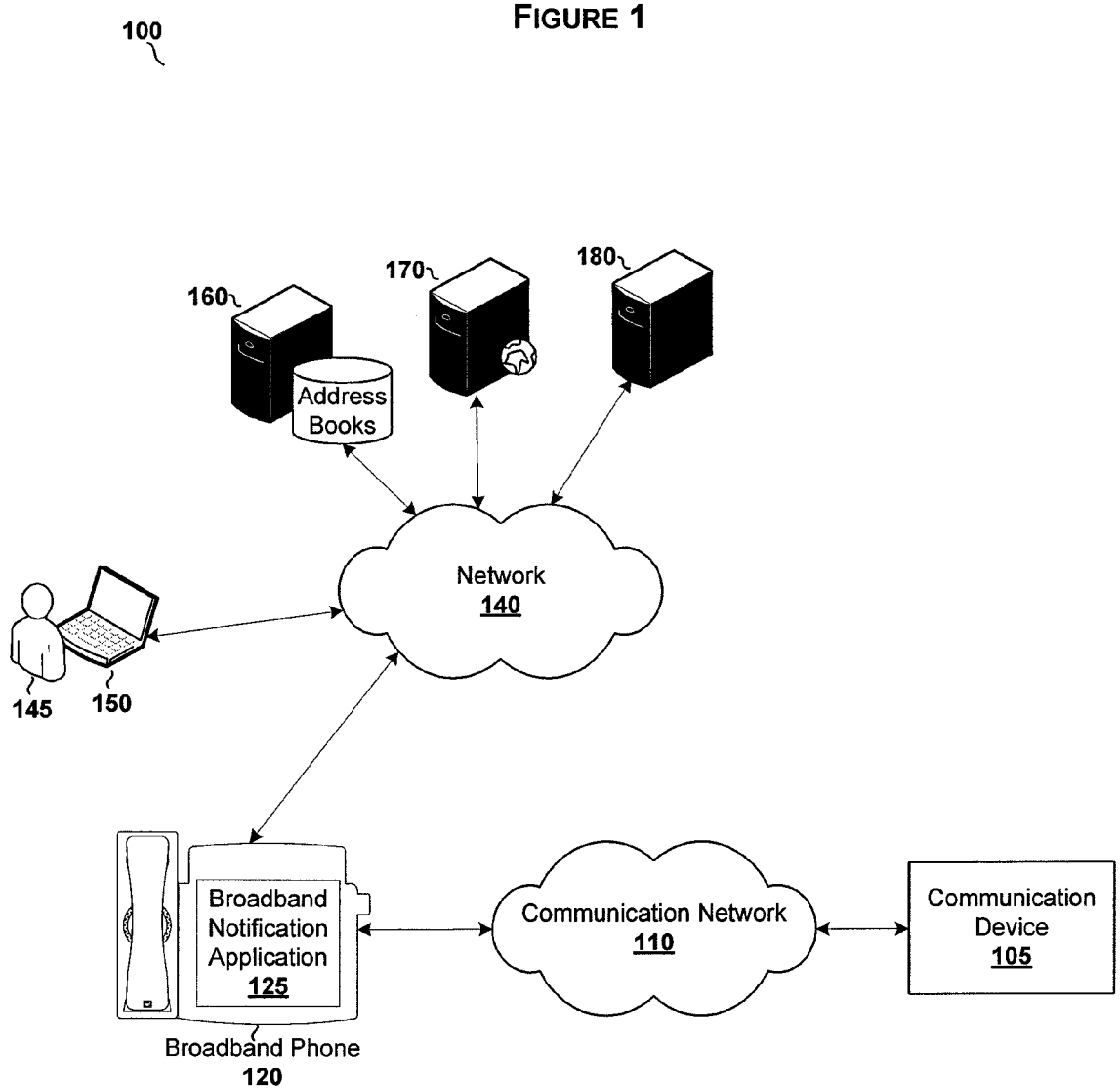
FIG. 1 depicts an embodiment of a network environment in which the illustrative embodiments may be implemented.

FIG. 1 depicts a network environment 100 in which the illustrative embodiments may be implemented for providing, among other things, local calling name caller identification notification via a broadband phone and network access to data stored on a broadband phone. As referenced herein, the phrase "broadband phone" means a phone capable of communicating data over a wide range of frequencies simultaneously rather than direct modulation. For example, in FIG. 1, broadband phone 120 may be an IP phone with an Ethernet port for communicating data via a digital subscriber line (DSL), cable, and/or fiber-optic line. However, the disclosed embodiments are not limited to any particular broadband communication protocol and/or communication interface.

As depicted in FIG. 1, broadband phone 120 may communicate with communication device 105 over communication network 110. Communication device 105 may be any type of communication device including, but not limited to, a landline telephone, a wireless mobile phone, a data processing system, and/or another broadband phone.

In some embodiments, communication network 110 may include a public switched telephone network, a mobile network, and/or a data network, such as, but not limited to, the Internet for routing communications between communication device 105 and broadband phone 120. The Internet is a global system of interconnected computer networks that interchange data using the standardized Internet Protocol Suite (TCP/IP). The Internet includes millions of private and public networks that are linked by copper wires, fiber-optic cables, wireless connections, and other technologies.

In accordance with one embodiment, broadband phone 120 receives a caller identification number associated with communication device 105 when communication device 105 places a call to broadband phone 120. In one embodiment, in response to receiving the caller identification number associated with the incoming call, broadband phone 120 queries an address book to determine a calling name associated with the caller identification number. In some embodiments, broadband phone 120 may query a plurality of address books, each address book associated with a unique person, to determine a calling name associated with the caller identification number. Further, in some embodiments, the address book/plurality of address books may be locally stored on broadband phone 120 and/or may be stored on a network server, such as, but not limited to, database server 160. For example, in one embodiment, broadband phone 120 may communicate with database server 160 over network 140 for determining a calling name associated with the caller identification number. Network 140 may include a number of different types of data networks, such as, but not limited to, the Internet, an intranet, a local area network (LAN), a wide area network (WAN), and wireless local area network (EAN) networks for providing data to broadband phone 120.

In addition, in accordance with some embodiments, broadband phone 120 may communicate with one or more data processing systems over network 140, such as, but not limited to, a web server 170 and an application server 180. For example, as will be further described, in one embodiment, broadband phone 120 may communicate with application server 180 for retrieving user preferences and performing an action based on the retrieved user preferences. Additionally, in other embodiments, a user 145 utilizing data processing system 150 may access a web portal/site hosted on web server 170 for accessing locally stored data on broadband phone 120.

Figure 2:
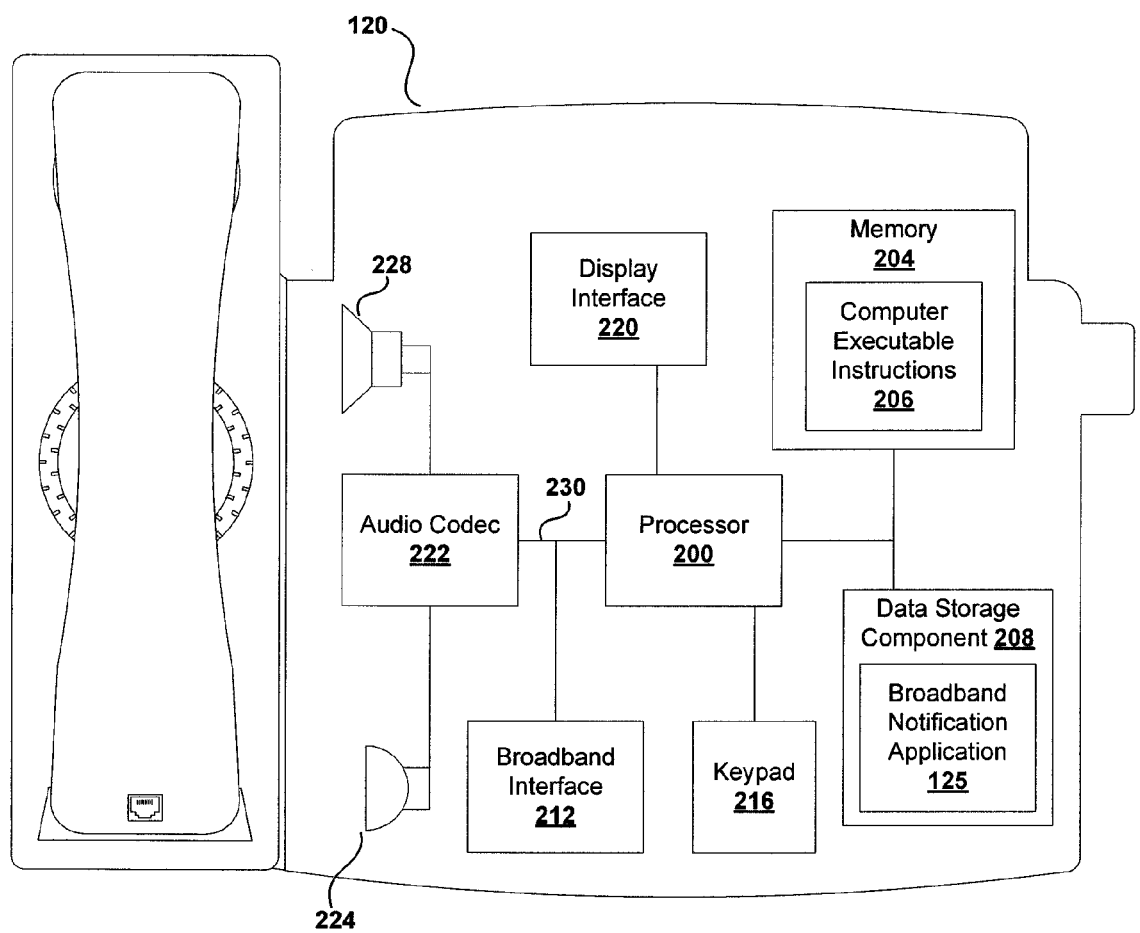
FIG. 2 depicts an embodiment of a broadband phone in accordance with the disclosed embodiments.

FIG. 2 depicts an embodiment of broadband phone 120 in which an embodiment of the disclosed invention may be implemented. In the illustrative embodiment, broadband phone 120 includes, but is not limited to, a processor 200, a memory component 204, a data storage component 208, a broadband interface 212, a keypad 216, a display interface 220, an audio codec 222, a microphone 224, and a speaker 228. A communications fabric 230 provides conductive pathways/traces to mechanically support and electrically connect the various components of broadband phone 120 for enabling data communications between the various components.

Processor 200 serves to execute computer executable instructions, such as, but not limited to, computer executable instructions 206 for software that may be loaded into memory component 204. Processor 200 may be a set of one or more processors or may be a multi-processor core, depending on the particular implementation. Further, processor 200 may be implemented using one or more heterogeneous processor systems in which a main processor is present with secondary processors on a single chip. In some embodiments, processor 200 may be a symmetric multi-processor system containing multiple processors of the same type.

Memory component 204 is a data storage component of broadband phone 120. In one embodiment, memory component 204 is volatile memory. Volatile memory is memory that loses its contents when cellular broadband phone 120 loses power. For example, in one embodiment, memory component 204 may be random access memory (RAM). Random access memory stores currently executing computer executable instructions 206 and/or data associated with an operating system, hardware device, and/or other software applications, such as, but not limited to, broadband notification application 125. Additionally, in some embodiments, memory component 204 may be embedded memory located on a printed circuit board, such as, but not limited to, a motherboard.

Data storage 208 is a non-volatile memory component of broadband phone 120. Data storage 208 stores instructions and data for the operating system and other applications/programs, such as, but not limited to, broadband notification application 125. Data storage 208 may take various forms depending on the particular implementation. For example, data storage 208 may contain one or more components or devices, such as, but not limited to, a hard drive, a flash memory, a rewritable optical disk, a rewritable magnetic tape, or some combination of the above. In some embodiments, data storage 208 may be removable, such as, a removable hard drive. Additionally, in some embodiments, data storage 208 may be an external component coupled to broadband phone 120, such as, but not limited to, an external hard drive or a flash drive.

In one embodiment, broadband notification application 125 comprises computer executable instructions for providing local calling name-caller identification notification via a broadband phone. For example, in some embodiments, broadband notification application 125 may determine a calling name associated with the caller identification number of an incoming call from one or more local and/or network address books for displaying the calling name and the caller identification number on a display screen of broadband phone 120. Additionally, in some embodiments, in response to the caller identification number matching an entry of an address book, broadband notification application 125 retrieves the user preferences associated with the address book and performs an action based on the user preferences. Further, in some embodiments, broadband notification application 125 may execute computer executable instructions 206 to enable network access to locally stored data on broadband phone 120. For example, in one embodiment, a user may access a website hosted by web server 170 and request access to locally stored data on broadband phone 120.

Broadband interface 212 enables broadband phone 120 to communicate data with one or more processing systems or devices over communication network 110 and network 140. In one embodiment, broadband interface 212 may include an Ethernet port for connecting an RJ45 network cable to broadband phone 120. Alternatively, or in addition to, in some embodiments, broadband interface 212 may provide communications using wireless communications links.

Keypad 216 enables user input, such as, but not limited to, a phone number, into broadband phone 120. In some embodiments, keypad 216 may include one or more function keys, such as, but not limited to, volume control, a speaker key, and a redial key.

Display interface 220 provides a mechanism to generate and output images and text to a display screen associated with broadband phone 120. For example, in some embodiments, display interface 220 may be a graphics controller integrated into the main circuit board of broadband phone 120. In addition, display interface 220 may include dedicated memory and one or more processing units for rendering images and text.

Audio codec 222 is a hardware device or a computer program that codes/translates audio signals into digital audio data. For example, audio codec 222 codes human speech received from microphone 224 into the appropriate digital audio data format for transmitting the audio data over communication network 110. In addition, audio codec 222 decodes digital audio data to reproduce the audio signals received at broadband phone 120 and outputs the audio signal to speaker 228.

The different components illustrated in FIG. 2 are not meant to provide architectural limitations to the manner in which different embodiments of broadband phone 120 may be implemented. For instance, broadband phone 120 may be implemented with components in addition to or in place of those illustrated in FIG. 2.

Figure 3:
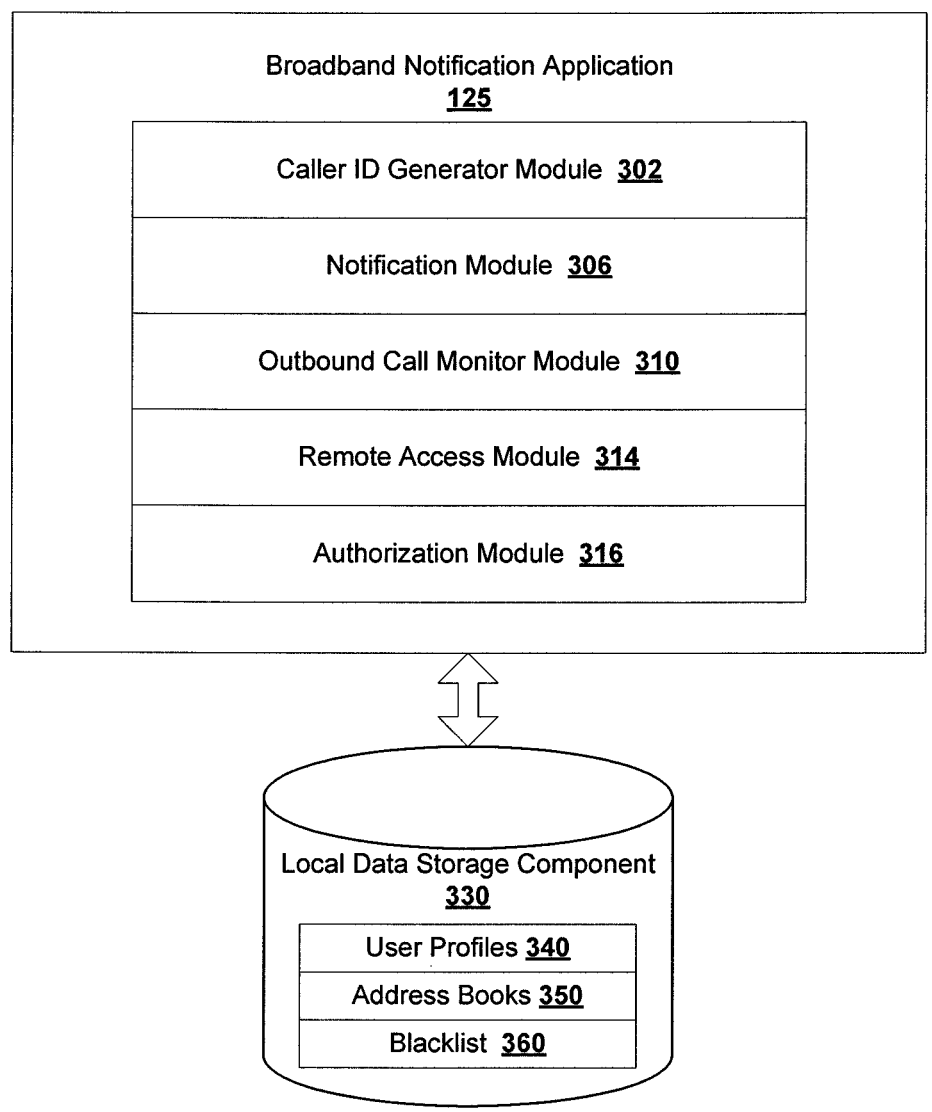
FIG. 3 depicts an embodiment of a broadband notification application in accordance with the disclosed embodiments.

With reference now to FIG. 3, an embodiment of a broadband notification application 125 in accordance with the disclosed embodiments is presented. In the depicted embodiment, broadband notification application 125 includes, but is not limited to, a caller identification generation module 302, a notification module 306, an outbound call monitoring module 310, a remote-access module 314, and an authorization module 316. In addition, in some embodiments, broadband notification application 125 may communicate with one or more data storage component, such as, but not limited to, local data storage component 330. Further, in some embodiments, the above referenced modules and related features, as further described below, may be implemented in hardware and/or a combination of hardware and software.

In one embodiment, caller identification generation module 302 may include computer executable instructions for receiving a calling number associated with a caller of an incoming call to a broadband phone and querying one or more address books to determine a calling name associated with the calling number. As referenced herein, an address book is any electronic data format, such as, but not limited to, a database, data table, or link-list, used for storing entries called contacts. In one embodiment, a contact entry includes, but is not limited to, a calling number and a calling name. Further, in some embodiments, each address book is associated with a different person. In one embodiment, in response to determining a calling name associated with a caller identification number, caller identification generation module 302 presents a calling name and the calling identification number on a display screen associated with the broadband phone.

In addition, in some embodiments, caller identification generation module 302 may also monitor broadband phone 120 to determine whether the incoming call is answered. In one embodiment, in response to a determination that the incoming call is not answered, caller identification generation module 302 may identify a person associated with an address book containing a match for the caller identification number. In one embodiment, caller identification generation module 302 may play a recorded voicemail-greeting message associated with the identified person. For example, suppose three people share office space and one business broadband phone. In this instance, caller identification generation module 302 is able play the appropriate voicemail greeting message associated with the intended recipient of an incoming call by identifying the calling number in an address book associated with the intended recipient.

Additionally, in some embodiments, caller identification generation module 302 may retrieve user preferences associated with the identified person and perform an action based on the user preferences. For example, in one embodiment, caller identification generation module 302 may pass the calling name and calling number to notification module 306 for notifying the identified person in a manner specified by the user preferences.

For example, in one embodiment, notification module 306 may include computer executable instructions for generating and sending an SMS message that includes information, such as, but not limited to, the calling name, calling number, and date/time of the incoming call, to an identified person associated with the respective address book. Additionally, in some embodiments, notification module 306 may be configured to generate and send an e-mail containing the incoming call information to a user-specified e-mail address associated with the identified person, i.e., the intended recipient of the call.

In some embodiments, broadband notification application 125 includes outbound call monitoring module 310 for monitoring outbound calls placed by broadband phone 120. For example, in one embodiment, outbound call monitoring module 310 may monitor calls to restricted numbers (e.g., numbers stored in blacklist 360), long-distance calls, and/or other calls that incur additional fees. In some embodiments, outbound call monitoring module 310 may restrict the placement of these calls. In other embodiments, a user must enter an authorization code for the placement of these calls. In some embodiments, outbound call monitoring module 310 may simply pass the calling information to notification module 306 for notifying a specified person of the restricted call activities.

Additionally, in some embodiments, broadband notification application 125 includes remote-access module 314 for enabling a user to remotely access the data stored on broadband phone 120, such as, but not limited to, call logs (e.g., incoming, outgoing, and miss calls) and locally stored contacts, such as, address books 350. For example, in one embodiment, a user may access a particular website associated with broadband phone 120 from any web enabled device and requests access to the locally stored data on broadband phone 120. Additionally, in some embodiments, remote-access module 314 may include computer executable instructions for providing an interactive voice response system that detects voice and keypad inputs for enabling a user to remotely access broadband phone 120 using a different phone device. Further, in some embodiments, remote-access module 314 may include computer executable instructions for enabling a remote user to access features and functions associated with broadband phone 120, such as, but not limited to, retrieving voice mails.

In one embodiment, broadband notification application 125 uses authorization module 316 to verify remote-access requests to broadband phone 120. In one embodiment, authorization module 316 includes computer executable instructions for requesting a user name and password and authenticating the received user name and password using data associated with user profiles 340 stored in local data storage component 330. In other embodiments, authorization module 316 may request a pin number, e.g., when accessing broadband phone 120 using another phone device. In one embodiment, authorization module 316 may include computer executable instructions for verifying a digital security certificate associated with a requesting client device and enabling access to only authorized devices.

Figure 4:
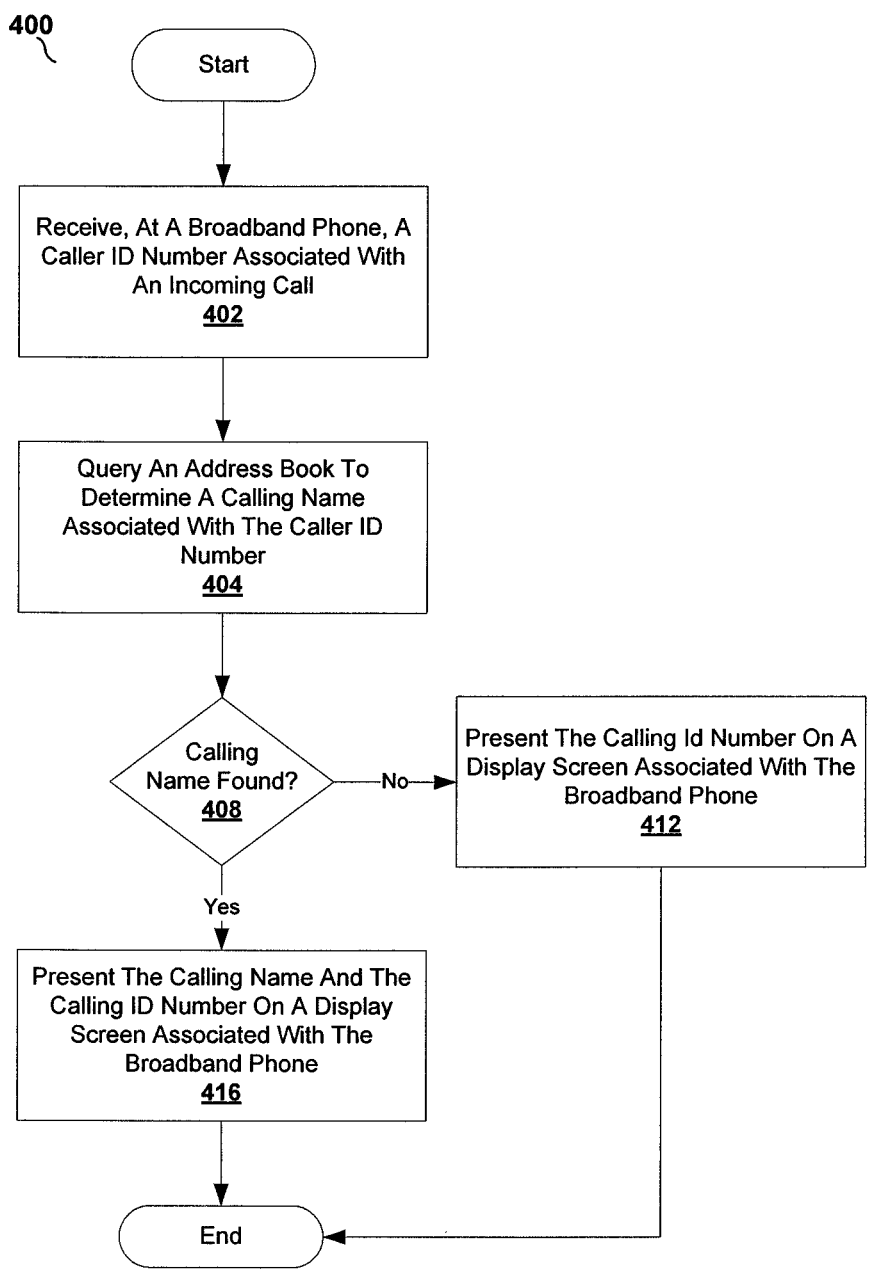
FIG. 4 depicts an embodiment of a process for providing caller identification notification via a broadband phone.

With reference now to FIG. 4, one embodiment of a process 400 for providing caller identification notification via a broadband phone in accordance with the disclosed embodiments is presented. Process 400 may be executed by broadband phone, such as, but not limited to, broadband phone 120 as depicted in FIG. 2. Process 400 begins, at step 402, by receiving, at a broadband phone, a caller identification number associated with an incoming call. The process queries an address book to determine a calling name associated with the caller identification number at step 404. At step 408, the process determines whether a calling name associated with the caller identification number is identified from a contact entry in the address book. Responsive to identifying a calling name associated with the caller identification number from an entry in the address book, the process, at step 416, presents the calling name and the caller identification number on a display screen associated with a broadband phone, with process 400 terminating thereafter. However, responsive to a determination of the caller identification number is not specified in an entry in the address book, the process, at step 412, presents the caller identification number on a display screen associated with the broadband phone, with process 400 terminating thereafter. Accordingly, process 400 enables local retrieval of a calling name associated with an incoming caller identification number for providing caller identification notification to a broadband phone.

Figure 5:
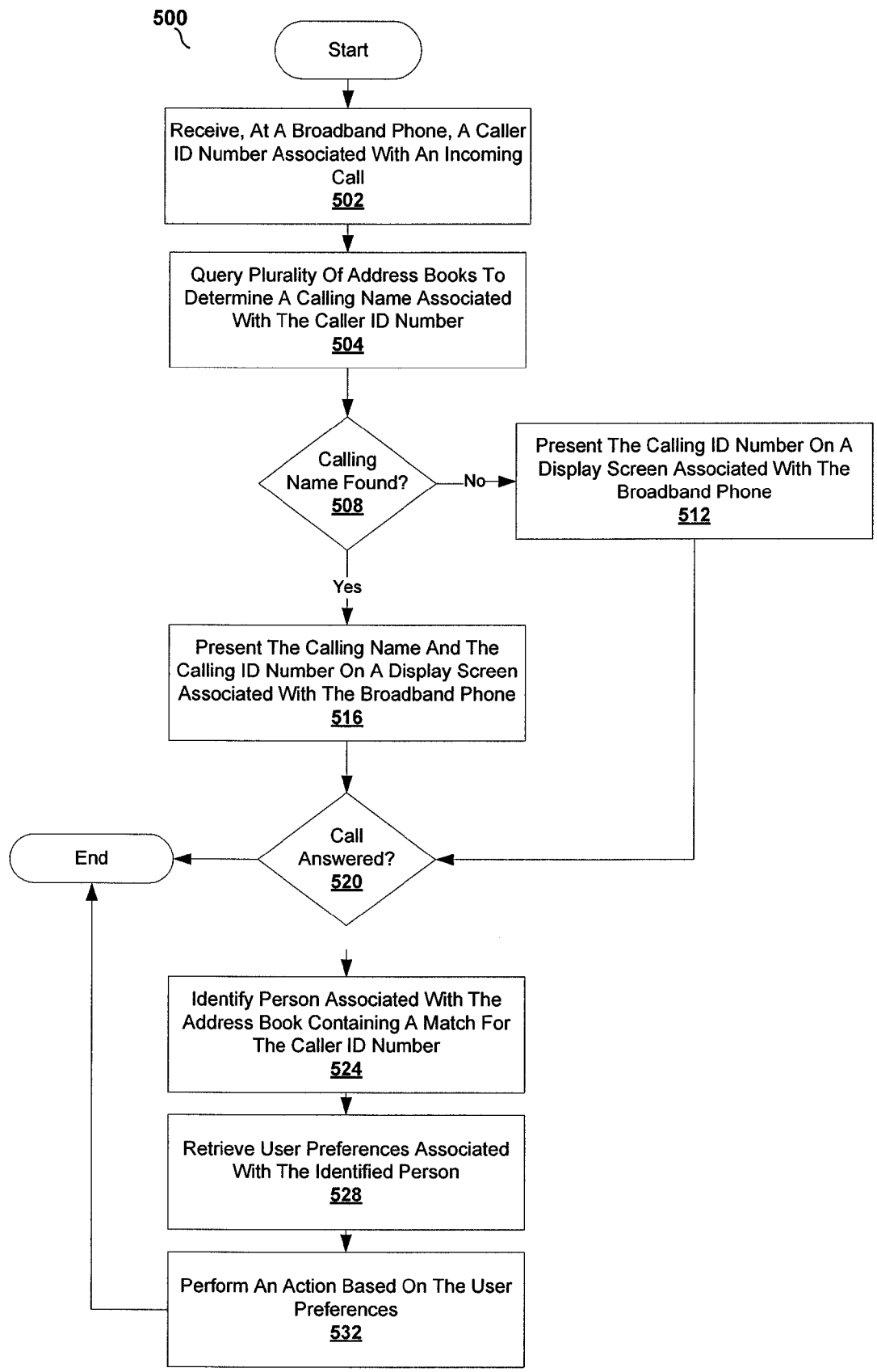
FIG. 5 depicts an embodiment of a process for performing a user-specified action associated with an incoming caller identification number.

FIG. 5 depicts an embodiment of a process 500 for performing a user-specified action associated with an incoming caller identification number. Process 500 begins, at step 502, by receiving, at a broadband phone, a caller identification number associated with an incoming call. At step 504, process 500 queries a plurality of address books to determine the calling name associated with the caller identification number. In some embodiments, the plurality of address books may be locally stored on the broadband phone. In other embodiments, the plurality of address books may be stored on a network or external device accessible by the broadband phone. In addition, the plurality of address books may be associated with one or more users. For example, in a residential location, a family of four may have for address books, wherein each address book is associated with a particular member of the family. In another example, one person may have multiple address books, such as, but not limited to, a personal address book and a work address book. Additionally, as will be further described, in some embodiments, each address book may be associated with a different set of user-specified rules and/or preferences. At step 508, the process determines whether a calling name associated with the caller identification number is identified from a contact entry in at least one of the address books within the plurality of address books. Responsive to identifying a calling name associated with the caller identification number, the process, at step 516, presents the calling name and the caller identification number on a display screen associated with a broadband phone. However, responsive to a determination of the caller identification number is not specified in an entry in at least one of the address books, the process, at step 512, presents just the caller identification number on a display screen associated with the broadband phone, with process 500 terminating thereafter.

At step 520, process 500 monitors the incoming call to a broadband phone to determine whether the call is answered within a specified period, e.g., before the call goes to voicemail. If the process detects the answering of the incoming call within the specified period, process 500 ends. However, if process 500 does not detect the answering of the incoming call within the specified period, the process, at step 524, identifies the person associated with the address book containing the match for the caller identification number. The process retrieves the user preferences associated with the identified person at step 528. At step 532, the process performs an action based on the user-specified preferences, with process 500 terminating thereafter. For example, in some embodiments, the user-specified preferences may request that an SMS message and/or e-mail message containing information associated with incoming call be generated and sent to the identified person associated with the address book. In another embodiment, process 500 may retrieve and play a voicemail greeting message associated with the identified person. In other embodiments, process 500 may retrieve and play a voicemail greeting message associated with the identified caller identification number. Further, in some embodiments, the user-specified preferences may include a time-based preference associated with a particular caller identification number. For example, in one embodiment, a user preference may request that all caller identification numbers that are associated with telemarketers received during the hours of 5 PM to 8 PM be automatically forwarded to voicemail. In another example, a user preference may request a particular voicemail greeting message be played for a particular caller identification number after a certain hour, e.g., a daughter's boyfriend calling after 9 PM may receive a voicemail greeting that requests the caller to call at a more appropriate time. Accordingly, process 500 enables a plurality of users to personalize use of a single broadband phone.

Figure 6:
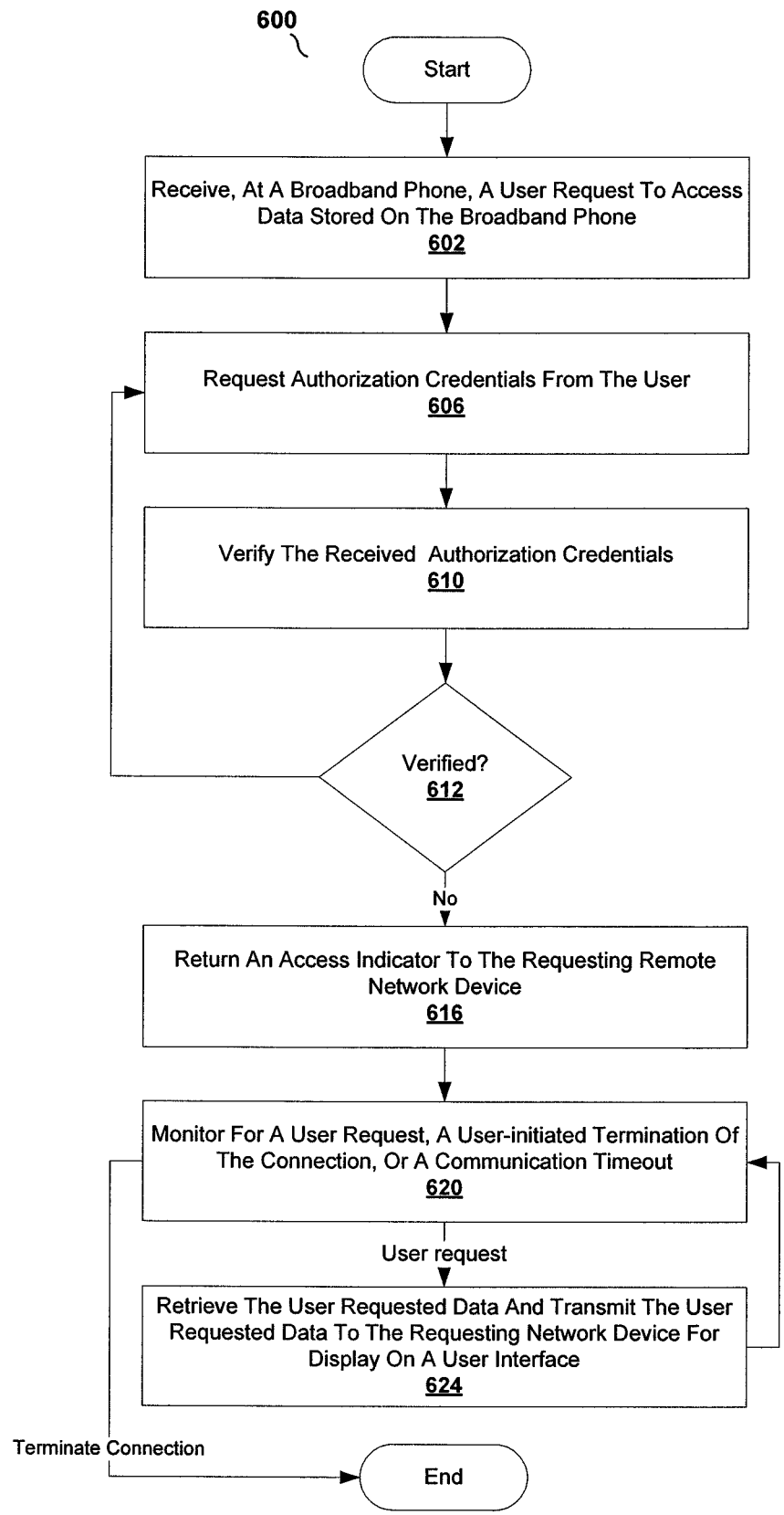
FIG. 6 depicts an embodiment of a process for providing network access to locally stored data on a broadband phone.

With reference now to FIG. 6, an embodiment of a process 600 for providing remote network access to data stored on a broadband phone is presented. Process 600 may be executed by broadband phone, such as, but not limited to, broadband phone 120 as depicted in FIG. 2. Process 600 begins, at step 602, by receiving, at a broadband phone, a remote network user request to access data stored on the broadband phone. At step 606, the process requests authorization credentials from the user. At step 610, the process verifies the received authorization credentials to determine whether the requesting user has access rights to the data stored on the broadband phone. If the process, at step 612, determines that the received authorization credentials does not grant the user access rights to the broadband phone, the process may return to step 606, and re-requests authorization credentials from the user. However, responsive to a determination that the received authorization credentials grants access rights to data stored on the broadband phone, the process, at step 616, returns an access indicator to the requesting remote network device, wherein the remote network device displays a user interface for enabling a user to request certain information, such as, a miss call log, inbound and outbound call data locally stored on the broadband phone.

At step 620, the process monitors for a user request, a user-initiated termination of the connection, or a communication timeout (e.g., no activity for a specified period). In response to receiving a user request to access a particular data file on the broadband phone, the process, at step 624, the process retrieves the user requested data and transmits the user requested data to the requesting network device for display on the user interface. In some embodiments, the user may remotely modify the locally stored data on the broadband phone. Process 600 repeats steps 620 and 624, until process 600 terminates by detecting a user-initiated termination of the connection, and/or a communication timeout.

In some embodiments, in addition to accessing and modifying locally stored data on a broadband phone, the user interface may also enable the user to perform functions and/or features associated with the broadband phone, such as, but not limited to, retrieving voicemail messages, placing a call out from the broadband phone, and/or remotely answer an incoming call to the broadband phone. In some embodiments, a user utilizing a personal computer with a speaker and microphone may place an outbound call or answer an incoming call routed through the broadband phone. For example, in one embodiment, the broadband phone would act as an intermediary device/proxy and reroute the IP voice data packets between the callee and the personal computer of the user. Further, in some embodiments, the user interface may include a feature for retrieving voicemails associated with a broadband phone. For example, in one embodiment, process 600 may access a local or network data storage component for retrieving the voicemails and forwarding the voicemails as data packets to the requesting network device. The requesting network device, upon receiving the voicemail data packets, may utilize a media player application to decode and play a voicemail message. Thus, the disclosed embodiments enable a user using any web-enabled device to remotely access locally stored data on a broadband phone and to perform functions and/or features associated with the broadband phone without having to install special software, such as, a softphone application.

Accordingly, the disclosed embodiments provide a system and method for providing, among other things, local calling name caller identification to a broadband phone, personalized user-specified actions associated with a plurality of address books/users based on an incoming caller identification number to a broadband phone, and remote access to data stored locally on a broadband phone. In addition, as will be appreciated by one skilled in the art, the disclosed embodiments may be embodied as a system, a method, or a computer program product. Additionally, the disclosed embodiments may be implemented entirely with hardware or as a software embodiment (including firmware, resident software, microcode, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A method for providing broadband notification, the method comprising:

receiving, at a broadband phone, a caller identification number associated with an incoming call;

querying a plurality of address books to determine a calling name associated with the caller identification number, the plurality of address books comprising a first address book associated with a first user of the broadband phone, who is a first unique person, and a second address book associated with a second user of the broadband phone, who is a second unique person;

identifying an entry in the first address book for the caller identification number;

identifying the calling name associated with the caller identification number in the first address book;

responsive to identifying the calling name associated with the caller identification number, presenting the calling name and the calling identification number on a display screen associated with the broadband phone;

responsive to a determination that the incoming call is not answered within a specified period, identifying the first unique person associated with the first address book containing the entry for the caller identification number;

retrieving user preferences associated with the first unique person; and performing an action based on the user preferences associated with the first unique person.

2. The method of claim 1, wherein one or more of the address books is locally stored on the broadband phone.

3. The method of claim 1, wherein one or more of the address books is a network address book accessible by the broadband phone.

4. The method of claim 1, wherein the action includes sending an e-mail to a user-specified e-mail address associated with the unique person.

5. The method of claim 1, wherein action includes sending a text message to a user-specified device associated with the unique person.

6. The method of claim 1, wherein the user preferences associated with the unique person may be set differently for each caller identification number.

7. The method of claim 1, wherein the user preferences associated with the unique person may be time based.

8. The method of claim 1, further comprising responsive to identifying a caller identification number associated with a black listed number, automatically forwarding the call to voicemail.

9. The method of claim 1, further comprising:

receiving, at the broadband phone, a calling number associated with an outgoing call;

querying a user-specified list to determine whether the calling number is on the user-specified list; and responsive to a determination that the calling number is on the user-specified list;

performing a user-specified action.

10. The method of claim 9, wherein the user-specified action includes logging a time, a date, and a duration of the outgoing call on a call log locally stored on the broadband phone.

11. A broadband phone, comprising:

a broadband interface; and a processor that is programmed to:

receive a caller identification number associated with an incoming call;

query a plurality of address books to determine a calling name associated with the caller identification number, the plurality of address books comprising a first address book associated with a first user of the broadband phone, who is a first unique person, and a second address book associated with a second user of the broadband phone, who is a second unique person;

identify an entry in the first address book for the caller identification number;

identify the calling name associated with the caller identification number in the first address book;

responsive to identifying the calling name associated with the caller identification number, present the calling name and the calling identification number on a display screen associated with the broadband phone;

responsive to a determination that the incoming call is not answered within a specified period, identify the first unique person associated with the first address book containing the entry for the caller identification number;

retrieve user preferences associated with the first unique person; and perform an action based on the user preferences associated with the first unique person.

12. The broadband phone of claim 11, wherein one or more of the address books is locally stored on the broadband phone.

13. The broadband phone of claim 11, wherein one or more of the address books is a network address book accessible by the broadband phone.

14. The broadband phone of claim 11, wherein the action includes sending an e-mail to a user-specified e-mail address associated with the unique person.

15. The broadband phone of claim 11, wherein the action includes sending a text message to a user-specified device associated with the unique person.

16. The broadband phone of claim 11, wherein the user preferences associated with the unique person may be set differently for each caller identification number.

17. The broadband phone of claim 11, wherein the user preferences associated with the unique person may be time based.

18. The broadband phone of claim 11, wherein the broadband phone, responsive to identifying a caller identification number associated with a black listed number, automatically forwards the call to voicemail.

19. The broadband phone of claim 11, wherein the broadband phone further:

receives a calling number associated with an outgoing call;

queries a user-specified list to determine whether the calling number is on the user-specified list; and responsive to a determination that the calling number is on the user-specified list;

performs a user-specified action.

20. The broadband phone of claim 19, wherein the user-specified action includes logging a time, a date, and a duration of the outgoing call on a call log locally stored on the broadband phone.

* * * * *